Jan. 29, 1924.
J. H. CLARK
1,481,830
EXPANSIBLE CLOSURE
Filed June 18, 1921
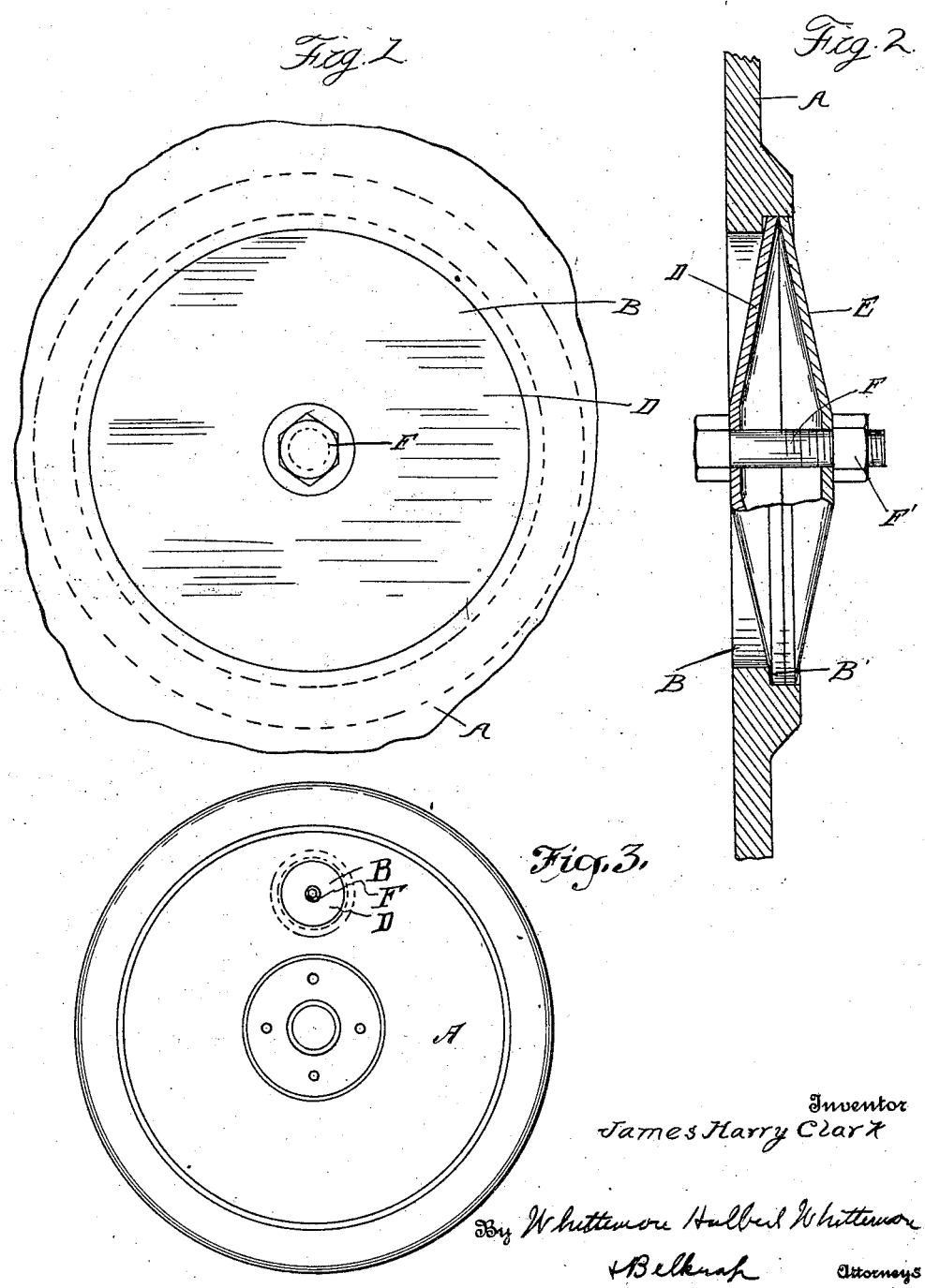
Inventor
James Harry Clark
By Whittemore Hulbert Whittemore
 Belknap          Attorneys Patented Jan. 29, 1924.

1,481,830

UNITED STATES PATENT OFFICE.

JAMES HARRY CLARK, OF DETROIT, MICHIGAN.

EXPANSIBLE CLOSURE.

Application filed June 18, 1921. Serial No. 478,772.

*To all whom it may concern:*

Be it known that I, JAMES HARRY CLARK, a citizen of the United States of America, residing at Detroit, in the county of Wayne and State of Michigan, have invented certain new and useful Improvements in Expansible Closures, of which the following is a specification, reference being had therein to the accompanying drawings.

This invention relates to closures, and relates particularly to closures expansible in diameter to clamp them within an opening.

The invention in its detail consists in forming a closure from a pair of opposed dished disks peripherally abutting, and provided centrally with a clamping connection whereby said disks may be stressed to decrease their spaced relation and increase their diameter.

In the drawings:

Figure 1 is an elevation view of the closure applied to a circular opening in a metal plate;

Figure 2 is an axial sectional view of the same taken on line 2—2 of Figure 1;

Figure 3 is a side view of a vehicle wheel with applicant's device incorporated.

In these views the reference character A designates a metal plate formed with a circular opening B, and having an intermediate annular shoulder B' in said opening. The improved closure for said opening comprises a pair of dished disks D and E arranged in opposed relation with their marginal portions abutting and connected by a clamping bolt and nut F and F' axially engaging said disks. The center portions of the disks are flattened to form parallel bearing surfaces for the head and the nut of said bolt. Upon initial insertion of said closure in the opening B the nut F is sufficiently loosened upon the bolt to relieve the disks of stress and permit them to assume their normally spaced relation, in which relation their diameter is such as to afford them a ready entry into the opening B. When the closure has been seated against the shoulder B' in said opening the nut F is tightened upon the bolt stressing the disks D and E toward each other and correspondingly increasing their diameter until their peripheries are clamped firmly against that of the opening B.

Thus it is seen that the described construction very securely mounts the closure within the opening, sealing the same peripherally and affording a clamping area of large extent. The closure furthermore is one that may be very quickly applied or removed. The spring tension to which the disk members are subjected by the clamping means re-acts upon the nut F to prevent the same being loosened by shocks or vibration.

The described construction has a particular application as a plug or closure for a manhole in a chambered double disk vehicle wheel (not shown).

What I claim as my invention is:

1. In a vehicle wheel, the combination with a plate having a circular opening, of a closure for said opening comprising only a pair of metallic disks of concavo-convex form having aligned apertures, the concave faces of said disks being opposed to each other with the marginal portions thereof abutting, a bolt extending through the aligned apertures in said disks, and a member cooperating with said bolt for moving the central portions of said disks toward each other to force the marginal portions thereof against the walls of the opening in said plate.

2. In a vehicle wheel, the combination with a plate having a circular opening, of a closure for said opening comprising only a pair of metallic disks of concave-convex form having parallel centrally disposed flattened portions provided with aligned apertures, the concave faces of said disks being opposed to each other with the marginal portions thereof abutting, a bolt extending through the aligned apertures in the flattened portions of said disks, and a member cooperating with said bolt for moving the flattened portions of said disks toward each other to force the marginal portions of the latter against the walls of the opening in said plate.

In testimony whereof I affix my signature.

JAMES HARRY CLARK.